Patented Feb. 1, 1938

2,106,708

UNITED STATES PATENT OFFICE 2,106,708

MANUFACTURE OF MODIFIED ORGANIC ISOCOLLOID MATERIALS

Laszlo Auer, Budapest, Hungary, assignor to J. Randolph Newman, Washington, D. C., as trustee No Drawing. Application July 8, 1929, Serial No. 466,587. Renewed October 13, 1936. In Great Britain July 8, 1929

22 Claims. (Cl. 87—12)

This invention relates to the manufacture of modified organic isocolloid materials and it comprises methods of making such modified products from organic isocolloid materials containing a relatively high concentration of dispersed phase, such as partially bodied fatty oils, etc., wherein a minor amount, advantageously 2 to 10 percent, of a modifying agent or polar compound is dispersed or dissolved in such organic isocolloid to modify the physical and other properties thereof, such as melting point, viscosity, state of aggregation, solubility, etc., sufficient polar compound being employed to alter one or more of said properties of the organic isocolloid material and said dispersion and modification being usually effected with the aid of heat, in the absence or presence of suitable solvents, and wherein the modified organic isocolloids so obtained are sometimes subsequently vulcanized, emulsified, etc., to further modify their properties; and it also comprises the modified organic isocolloids so obtained, all as more fully hereinafter described and as claimed.

In other prior, copending applications, I have described processes for modifying the physical properties of organic isocolloids. This application is a continuation in part of my other applications.

It is in part a continuation and in part a division of Serial No. 143,786, filed Oct. 23, 1926 and of the various divisions and continuations of that parent application, particularly the continuation thereof filed April 30, 1929, Serial No. 359,425. The parent application and the continuations thereof are as follows:—Ser. No. 143,786, filed Oct. 23, 1926; Ser. No. 273,159, filed Apr. 26, 1928, now Patent No. 1,985,230; Ser. No. 273,160, filed Apr. 26, 1928, now Patent No. 1,985,231; Ser. No. 359,424, filed Apr. 30, 1929, now Patent No. 2,007,958; Ser. No. 359,425, filed Apr. 30, 1929; Ser. No. 359,426, filed Apr. 30, 1929, now Patent No. 1,980,366; Ser. No. 359,427, filed Apr. 30, 1929, now Patent No. 1,957,437; Ser. No. 446,170, filed Apr. 21, 1930; Ser. No. 446,171, filed Apr. 21, 1930, now Patent No. 1,980,367; Ser. No. 446,172, filed Apr. 21, 1930; and Ser. No. 446,174, filed Apr. 21, 1930.

As disclosed in the above copending applications, I have found that by dispersing or dissolving various modifying agents in organic isocolloid materials, I obtain modified products having altered physical properties, etc., which are useful in the commercial and industrial arts. The modifying agents are employed in minor amounts and are organic and inorganic compounds which are electrolytes or polar compounds capable of influencing the modification of the isocolloid substances.

The present invention is based upon my further discovery that when an organic isocolloid containing a relatively high concentration of dispersed phase is employed as the starting material in any of my prior processes, the desired modification is more readily and quickly obtained, even obtained at lower temperatures or a shorter time or both in many cases. In some cases with the dispersed phase in satisfactory concentration in such organic isocolloids, a simple dispersion of the modifying agent therein causes the desired changes in the physical properties of the starting material.

As most of the ordinary, natural organic isocolloids, such as linseed oil and other fatty oils, do not in the natural state contain a sufficiently high concentration of dispersed phase to give such results, I usually employ in the present invention, an organic isocolloid the concentration of the dispersed phase of which has been increased by known means, such as partially bodied fatty oils, etc.; although other organic isocolloids, either natural or artificial, having a high concentration of dispersed phase may be employed if desired.

Thus in the usual practice of the present invention, I ordinarily employ a new two step method to modify these organic isocolloids, namely, methods which comprise first increasing the concentration of the dispersed phase to a suitable degree by known procedures and thereafter dispersing the modifying agent in such materials. By this combination of steps, improved results are obtained. In such methods, I may employ the modifying agents and other details shown in my prior applications in practicing the second step of the new processes. However, in the general practice of the present invention, I may use any natural or artificial organic isocolloid which already has a suitable high concentration of the dispersed phase, this being the main distinction of the present invention.

In my prior methods, in cases where the concentration of the dispersed phase of the isocolloid is comparatively small, in addition to the dispersion of the modifying agent, an increase in the concentration of the dispersed phase is necessary to bring about satisfactory results in changing the physical properties. This is the case, e. g., with linseed oil. When linseed oil is modified with the aid of inorganic agents the dispersion of the reagent and the increase in the concentration of the dispersed phase occur side by side in the same reaction. In other words when an inorganic reagent is used, longer heating at higher temperatures is necessary to bring about dispersion of the modifying reagent in the reaction mass. In nearly all cases long heating at higher temperatures causes discoloration, i. e. darkening of the product, which is due to charring of small particles of the oil caused by overheating. As a light color of the modified isocolloids is very desirable in many industrial applications, investigations have been carried out to enable improvements to be made in this direction.

I have found that in the case of organic isocolloids containing the dispersed phase in a satisfactory concentration a simple dispersion of the modifying agent on the isocolloid seems to bring about changes in the physical properties of the isocolloids. The present invention is based on the discovery that if organic isocolloids with relatively high concentrations of the disperse phase are used as starting materials, the modifying reaction occurs at much lower temperatures (100-250° C.) than in the case in which organic isocolloids containing a low concentration of dispersed phase are used as starting materials. Examples of organic isocolloids containing a high concentration of dispersed phase are thickened fatty oils.

Such thickened fatty oils are well known in the art and may be obtained in several ways which are likewise well known methods for thickening such oils. The following are typical examples of thickened fatty oils of particular types and of the methods of preparing them:—

1. Uviol oil, obtained by treating the oil with ultra-violet rays.

2. Oxidized oils or air-blown oils, obtained by blowing air or oxygen over or through the oil to be thickened, either at room or elevated temperatures.

3. Blown oils, non-oxidized, obtained by blowing gases such as carbon dioxide, nitrogen, hydrogen, sulphur dioxide or sulphuretted hydrogen (hydrogen sulphide) through the oil to be thickened and partially bodied at room temperature or elevated temperatures, elevated temperatures usually being employed in making this class of thickened oils.

4. Stand oil (heat-bodied or polymerized oil), obtained by heating the oils in an ordinary atmosphere at elevated temperatures for a long time.

Polymerized oils (4) are heat-bodied oils produced by heating unsaturated fatty oils to polymerizing temperatures, 200° C. and above, for several hours until a thickened, viscous, heat-bodied oil product is obtained. They are also known as "stand oil." This method is well known in the art and these heat-bodied oils are a distinct type of commercial oil products. They are somewhat different from oxidized oils or air-blown oils (Class 2 ante).

In my present processes any of these oils partially bodied by known methods and containing a relatively high concentration of dispersed phase may be used.

Thus according to the present invention, I have developed a two step method for modifying the physical properties, (such as melting point, viscosity, state of aggregate, solubility) of organic isocolloids containing high molecular unsaturated acids, such as fatty oils, which consists in first increasing the concentration of the dispersed phase to a suitable degree by preparing thickened oils (stand oils, bodied oils, blown oils) from the starting materials and thereafter adding the modifying agent and dispersing the modifying agent in the thickened oil by the aid of heat whereby the modifying process may be carried out at a lower temperature and/or in a shorter time.

There are several ways of carrying out the present invention. One of these ways is the use of organic modifying agents which are fusible and/or soluble at lower temperatures. Such modifying agents are given in my patent applications, Ser. Nos. 143,786; 359,425; 446,170; and 446,172, filed by myself as sole inventor and in the application Serial No. 446,173 filed jointly by me and one Lajos Susztek.

From the modifying agents described and claimed in my patent application Ser. No. 143,786 good results may be obtained in the present process e. g. with the organic metal compounds and with salts of organic acids, and with the inorganic modifying agents such as lithium carbonate, lithium sulphite, and in general with salts of weak acids with alkali and alkaline earth metals and zinc and magnesium, such as sulphides, sulphites and carbonates of these metals. Lithium carbonate or lithium sulphite solidify a linseed oil stand oil at 250° C. in 2 hours when applied e. g. 5 parts to 100 parts of oil, whereas a raw linseed oil containing a low concentration of the dispersed phase requires a temperature of 280-300° C. and a much longer period of heating to produce the same effect.

Compounds which comprise within the molecule an acidic inorganic residue and an organic residue as defined in my copending patent application Serial No. 359,425 may further be used with advantage as modifying agents. As examples of this type of organic modifying agents benzenesulphonic acid and 2:5 dichlorbenzene-sulphonic acid may be given which act even at 140-150° C.

Further modifying agents useful for the present process are aromatic amines, as disclosed in my co-pending application Ser. No. 446,170 for example benzidine, p-phenylenediamine, beta-naphthylamine etc. As in the case of my application No. 446,170 diamines and amines with high molecular weight also give very satisfactory results in the present case. The effect of "greatly modified isocolloids" as modifying agents is in the present process similar to the effect disclosed in my copending application Serial No. 446,172. The process according to my invention may further be carried out by using soaps of the alkali and alkaline earth metals and of zinc and magnesium as modifying agents according to the application Ser. No. 446,173, filed April 21, 1930 by me and one Lajos Susztek; now Patent No. 1,963,065.

A further improved method according to which the modifying agent can be dispersed in the isocolloids at lower temperatures is the use of solutions of the modifying agents in inert organic solvents. Very good results can be obtained in the case of linseed oil stand oil for instance with p-nitrophenol and o-nitrophenol, further amongst others with benzidine base, benzenesulphonic acid, benzenesulphonyl chloride, 2:5 dichlorbenzene sulphonic acid, naphthalene tetrachloride. As solvents, benzene (benzole), methyl-ethylketone, ether, acetone, a mixture of ether and acetone and the like may be used. Also certain inorganic reagents may be used in solution. Good results have been obtained e. g. in the case of linseed oil stand oil with chlorsulphonic acid dissolved in benzene, or barium thyocyanate dissolved in methyl-ethyl-ketone amongst others. In the case of wood oil, the natural oil, as well as a bodied oil (stand oil) may be used in this modification of the process. In most cases a heating between 120° C. and 130° C. yields good results and it is only in a few cases necessary to heat for a short time at 200° C. The heating is preferably carried out under subatmospheric pressure. The solvents evaporate i. e. distil off during the process and they are only used in the process to aid the dispersion. In many cases the heating may be continued after all of the solvent is distilled off as by this means very highly modified products may be obtained.

The amount of the modifying agent used in the process is 2–10% but less or more may be also used for special purposes.

In carrying out the process all methods and means disclosed in the above-mentioned prior applications can be used. The products of the process can be treated further, e. g. vulcanized, emulsified, etc. as described in the above specifications.

By the expression "simple dispersion" in the above specification not the disappearance of a e. g. fusible modifying agent is meant, but that the particles of the modifying agent are adsorbed by the particles of the material to be treated, so that the "simple dispersion" always takes a certain time, generally at least one hour and only in exceptional cases less.

The products of the process are particularly useful as varnish bases and as rubber compounding ingredients, either vulcanized or unvulcanized.

What I claim is:

1. In the manufacture of modified products from fatty oils, the process which comprises mixing a stand oil, derived from linseed oil, with lithium sulphite and heating the mixture to about 250° C. for about 2 hours until a solidified product is obtained.

2. In the manufacture of heavily bodied oil products from fatty oils, the process which comprises first thickening the fatty oil by passing a current of gas through the heated oil until a thickened, liquid oil is obtained, adding to the thickened oil thus obtained a modifying agent capable of facilitating the bodying of said oil and of modifying the properties thereof, and heating the mixture to a temperature between 100 and 250° C. until a thicker, more heavily bodied oil product is obtained.

3. In the manufacture of heavily bodied oil products from fatty oils, the improvement which comprises first partially bodying the fatty oil and then further heat-bodying and modifying the partially bodied oil products by mixing a metal salt with the partially bodied oil and heating the mixture to between 100° and 250° C. until said metal salt is dispersed in said oil and until a modified, thickened, heat-bodied oil product is obtained, said metal salt being one capable of facilitating the bodying of said oil and of modifying the properties thereof.

4. The process of claim 3 wherein the said first partially bodying is a heat-bodying obtained by heating the fatty oil to a temperature sufficient to polymerize and thicken the oil, said temperature being at least 200° C. until a stand oil is obtained.

5. The process of claim 3 wherein said metal salt is an alkali metal salt of a weak acid.

6. The process of claim 3 wherein said metal salt is a lithium salt.

7. The process of claim 3 wherein said metal salt is lithium sulphite.

8. The process of claim 3 wherein said metal salt is a metal sulphite.

9. The process of claim 3 wherein said metal salt is a metal salt of a weak inorganic acid.

10. In the manufacture of bodied oil products from fatty oils, by improved two step procedures, the improvement which comprises first partially bodying the oil by known methods until the oil has a relatively higher concentration of dispersed phase, and then further bodying the partially bodied oil product, in the presence of a modifying agent by heating a mixture of the partially bodied oil product and the modifying agent until a modified, bodied oil product of the desired heavy body is obtained, the modifying agent being used in minor amount and being a polar compound capable of facilitating the heat-bodying of said oil and of modifying the properties thereof.

11. The process of claim 10 wherein said heating of the said mixture is effected under vacuum at temperatures between 100° and 250° C.

12. The process of claim 10 wherein a current of gas is blown through the hot oil during the first partial bodying thereof.

13. In the manufacture of bodied products from organic isocolloids containing unsaturated carbon compounds, the improved process which comprises mixing a partially bodied organic isocolloid containing unsaturated carbon compounds and having a relatively high concentration of dispersed phase, with a modifying agent capable of facilitating the bodying of said isocolloid and of modifying the properties thereof, and then heating the mixture to temperatures sufficient to further body and modify the partially bodied isocolloid until a modified, heat-bodied product is obtained.

14. The process of claim 13 wherein the said isocolloid is a drying fatty oil and wherein the first partial bodying is effected by blowing a current of sulphur dioxide through the fatty oil while heated to temperatures sufficient to thicken and body the fatty oil.

15. In the manufacture of modified, heavily bodied oil products from fatty oils, the improved process which comprises first partially bodying the said oil by blowing a current of sulphur dioxide through the oil while heated to a temperature sufficient to thicken and body it until substantial bodying is obtained and then mixing the partially bodied oil so obtained with a minor amount of a metal salt and heating the mixture to temperatures sufficient to further body it until a modified heavily bodied oil product is obtained, said metal salt being one capable of facilitating the bodying of said oil and of modifying the properties thereof.

16. The process of claim 3 wherein said metal salt is a carbonate.

17. The process of claim 3 wherein said metal salt is a soap of an alkaline earth metal.

18. The process of claim 13 wherein between 2 to 10 per cent of said modifying agent is employed.

19. The process of claim 3 wherein said metal salt is an alkali metal sulphite.

20. The process of claim 13 wherein said partially bodied organic isocolloid is a thickened, partially bodied, heat-bodied fatty oil and said modifying agent is an alkali metal sulphite and wherein between 2 to 10 per cent of said alkali metal sulphite is mixed with such partially bodied fatty oil prior to said heating of the mixture to further body the oil.

21. The process of claim 10 wherein said modifying agent is an alkali metal sulphite.

22. The process of claim 3 wherein said metal salt is an alkali metal carbonate.

LASZLO AUER.